2,783,210

BIS-BIGUANIDES AS STABILIZING AGENTS

George W. Kennerly, Stamford, Conn., assignor to American Cyanamid Company, New York, N. Y., a corporation of Maine No Drawing. Application August 6, 1953,
Serial No. 372,815

7 Claims. (Cl. 252—401)

This invention relates to stabilizing agents and to the stabilization of organic compositions and particularly to the stabilization of organic substances such as gasoline, soap, lubricating oils, synthetic lubricants, edible oils, fats, waxes, paraffin, hydraulic oils, and the like, which are subject to deterioration caused by the action of molecular oxygen and by metals and their compounds.

Many organic compositions are readily attacked by oxygen and the resulting deterioration imparts undesirable qualities to them, such as discoloration, polymerization, development of rancidity, etc., which eventually impairs or even destroys their usefulness. Signal success has been achieved in recent years in the preservation of such organic compositions by the discovery and use of compounds generically called "oxidation inhibitors" or "antioxidants." These agents, mostly oxidizable organic compounds, retard and inhibit the detrimental autocatalytic processes in such compositions even when they are present therein in very low concentrations. Since antioxidants are themselves oxidized in the course of time, as a result of autoxidation, the beneficial effects obtained by their use are not permanent and they protect the organic compositions only so long as they are not rendered inactive. They are, moreover, very specific in action and each group of auto-oxidizable substances requires a different type of antioxidant or stabilizer for the best results.

Metals, notably copper and its catalytically active compounds, are known to accelerate the rate of oxidation and deterioration of such organic compositions. For example, it is well known that copper compounds speed the formation of gum in cracked gasoline and that other metallic compounds catalyze the deterioration of lubricating oils, synthetic lubricants, and the like. They also accelerate the oxidation of aromatic hydroxy and amino anti-oxidants used to stabilize these oxidizable substances. Hence, these metal catalysts and the anti-oxidants are antagonistic in nature and in action and the normal inhibiting effect of the latter is greatly reduced or neutralized by the presence of the former.

Metal compounds occur naturally in many organic compositions but often in such slight traces as to cause very little harm. Their concentrations, however, are frequently unavoidably raised during the course of handling and utilizing the products wherein vessels and conduits made of metals containing copper or other metals are used for storage and transportation or in other situations wherein ingredients contaminated with metal compounds might be added.

The harm done by these extraneous catalysts may be prevented by at least three methods: (1) their removal by purification, but often this is practically impossible of accomplishment and usually too costly to be economically feasible; (2) the addition of a sufficient amount of an antioxidant so that its preserving effect is equal to or greater than the pro-oxidant effects of the metal catalysts present, but the effectiveness of the antioxidant is so greatly diminished by the metal catalysts that the advantage gained under this circumstance is seldom worth the cost of the increased quantity of antioxidant required for adequate stabilization; and (3) the suppression of the catalytic activity of the metal compounds by chemical means without physically removing them from the system.

It is an object of the present invention to provide a stabilizing agent which will retard the oxidation and deterioration of organic compositions caused by the action of air or molecular oxygen and promoted by the presence of certain metal catalysts and/or their catalytically active compounds. Another object is to render stabilizers and antioxidants, which are relatively ineffective in the presence of metal catalysts and their catalytically active compounds, effective to inhibit the oxidation of oxidizable organic compositions even in the presence of metal catalysts and their catalytically active compounds. A further object is to provide a new class of metal deactivators which are effective to render metal catalysts inactive to catalyze the oxidation of oxidizable organic compositions containing or in contact with such metal catalysts. A more particular object is to inhibit the deterioration of gasoline and soap in the presence of metal catalysts and their catalytically active compounds. Still other objects will appear hereinafter.

The above and other objects may be accomplished in accordance with our invention by adding to organic compositions, normally subject to oxidation and deterioration caused by the action of air or molecular oxygen and containing a metallic catalyst normally effective to catalyze oxidation of said organic compositions, a stabilizer or metal deactivator in a small proportion sufficient to deactivate said catalyst, said metal deactivators being bisbiguanides having the formula:

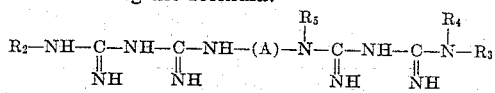

wherein $R_2$ and $R_3$ are members of the group consisting of aryl and alkaryl radicals; $R_4$ and $R_5$ are hydrogen or alkyl radicals having up to five carbon atoms; and A is a bifunctional group having from two to four carbon atoms, such as ethylene, trimethylene and tetramethylene.

In the following specific examples which are given to illustrate the bisbiguanides of the present invention, it is to be noted that the substituents attached to each biguanide radical are located at the terminal nitrogen atom, unless otherwise indicated. The following examples are given as illustrative but not as limitative of the invention: ethylene bis(o-tolyl biguanide); ethylene bis(p-tolyl biguanide); ethylene bis(3,5-dimethylphenyl biguanide); ethylene bis(p-tert-amylphenyl biguanide); ethylene bis(nonylphenyl biguanide); ethylene bis(phenyl biguanide); ethylene bis(N-butylphenyl biguanide); ethylene bis(2,5-diethoxyphenyl biguanide); ethylene bis(2,4-dimethylphenyl biguanide); ethylene bis(o-diphenyl biguanide); ethylene bis(mixed amylnaphthyl biguanide); N-butyl ethylene bis(phenyl biguanide); trimethylene bis(o-tolyl biguanide); N-butyl trimethylene bis(phenyl biguanide); tetramethylene bis(o-tolyl biguanide); etc.

The preparation of several of these compounds is given herewith to illustrate the invention.

EXAMPLE 1

*Ethylene bis(o-tolyl biguanide)*

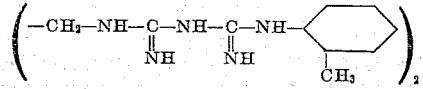

| | | |
|---|---|---|
| Ethylene bisdicyandiamide | 0.1 mole | 19.4 g. |
| o-Toluidine | 0.22 mole | 23.6 g. |
| HCl (conc.) | 0.22 mole | 22 g. |
| Water | 75 ml | |
| Cellosolve | 25 ml | |

The above mixture was refluxed for one hour. On cooling the reaction mixture, the product was very slow in crystallizing. The mixture was finally filtered and the solid air-dried. The 29 g. of product, M. P. 221° C. with decomposition, was crystallized from 110 ml. of water. Only 17 g. which decomposed at 224° C. was recovered. A second crystallization from water gave an M. P. of 230°, with decomposition.

Analysis: | Percent N | Percent Cl
--- | --- | ---
Calc. for C20H28N10·2HCl | 29.11 | 14.76
Found | 28.7 | 14.1

Ten grams (0.02 mole) of the hydrochloride was dissolved in 50 ml. of hot water. The solution was treated with "Darco" and filtered. The filtrate was slowly added to a cold solution of 2.5 g. of sodium hydroxide in 25 ml. of water. The free base separated as an oil but, upon cooling, immediately solidified. The mixture was filtered, the solid washed with water, and air-dried. While drying the solid became gummy. Crystallization from alcohol gave a solid which melted at 156–157° C.

The hydrochloride as well as the free base gave the purple biguanide test with copper sulfate solution.

EXAMPLE 2

Ethylene bis(p-tolylbiguanide)

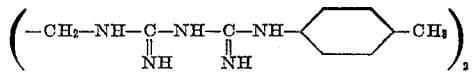

| | | |
--- | --- | ---
Ethylene bis-dicyandiamide | 0.1 mole | 19.4 g.
p-Toluidine | 0.2 mole | 21.4 g.
HCl (conc.) | 0.2 mole | 20 g.
Cellosolve | 50 ml |
Water | 50 ml |

Refluxing for 75 minutes and then cooling gave 35 g. of a solid, M. P. 237° C. An 85% recovery of the hydrochloride (M. P. 241° C., decomposition) was obtained after crystallization from a 10% aqueous solution.

| Analysis | Percent N | Percent Cl
--- | --- | ---
Calc. for C20H28N10·2HCl | 29.11 | 14.76
Found | 28.4 | 14.3

A solution of 14.5 g. of the hydrochloride in 150 ml. of 16% aq. alcohol was treated with "Darco" and filtered. The hot filtrate was added slowly to a cold solution 3.5 g. of sodium hydroxide in 30 ml. of water. The product was first in the form of an oil which solidified on cooling. The water was decanted and the solid washed with water. Addition of 50 ml. of alcohol to the residue gave almost complete solution, but on standing the solid again separated. The mixture was filtered and the solid dried in a desiccator. Ten grams of product which melted with decomposition at 165° C. was obtained.

EXAMPLE 3

Ethylene bis(phenylbiguanide)

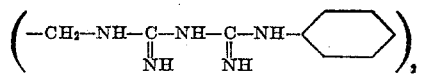

| | | |
--- | --- | ---
Ethylene bis-dicyandiamide | 0.10 mole | 19.4 g.
Aniline | 0.22 mole | 20.4 g.
HCl (conc.) | 0.22 mole | 22 g.
Water | 75 ml |
Cellosolve | 25 ml |

The mixture was refluxed for one hour and then cooled to give 33 g. of a solid which melted with decomposition at 215° C. The hydrochloride was converted to the base, M. P. 170° C. (decomposition), in a 90% yield. The melting point was unchanged by crystallization from a benzene-alcohol mixture.

Analysis: | Percent N
--- | ---
Cal. for C18H24N10 | 36.84
Found | 35.40

EXAMPLE 4

Ethylene bis(nonylphenylbiguanide)

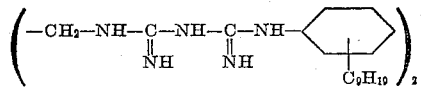

| | | |
--- | --- | ---
C9 Alkyl aniline | 0.2 mole | 43.8 g.
HCl (conc.) | 0.2 mole | 20 g.
Ethylene bis-dicyandiamide | 0.1 mole | 19.4 g.
Water | 125 ml |
Cellosolve | 20 ml |

A gelatinous mixture was obtained when a suspension of the C9 alkyl aniline in 75 ml. of water was neutralized with hydrochloric acid. Fifty milliliters of water and 10 ml. of Cellosolve were added, the mixture heated, and resulting solution treated with "Darco." The ethylene bis-dicyandiamide was added and mixture heated. After thirty minutes, complete solution was not obtained, so 10 ml. of Cellosolve was added and heating continued for thirty minutes. On cooling the solution a gelatinous mixture was obtained which did not crystallize on standing. Addition of a solution containing 0.3 mole of sodium nitrate gave a gummy solid.

The water was decanted and 100 ml. of alcohol added to the residue. The resulting solution was added to an excess of cold, dilute alkali. The product was extracted with benzene and the benzene solution washed with water and dried over calcium sulfate. The mixture was filtered, and the filtrate distilled under reduced pressure until most of the benzene was removed. After drying the residue in a vacuum desiccator, a dark brown, waxy oil remained.

Analysis: | Percent N
--- | ---
Calc. for C36H60N10 | 22.15
Found | 15.77

EXAMPLE 5

Ethylene bis(2,5-diethoxyphenyl biguanide)

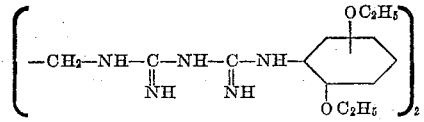

| | | |
--- | --- | ---
Aminohydroquinone diethyl ether | 0.235 mole | 42.6 g.
HCl (conc.) | 0.2 mole | 20 g.
Ethylene bis-dicyandiamide | 0.1 mole | 19.4 g.
Water | 100 ml |

A mixture of the amine, acid, and 75 ml. of water was heated to obtain complete solution. The dicyandiamide and 25 ml. of water were then added and the mixture refluxed for one hour. The solution was cooled and the crystalline solid that separated was filtered off. There was obtained 59 g. of the hydrochloride, M. P. 190° C. Recrystallization from 200 ml. of water gave 45 g. of solid, M. P. 192° C. The recrystallized product was slurried in benzene in an attempt to remove the excess amine. The mixture was filtered and the procedure repeated twice. Thirty-six grams of solid, M. P. 206° C., was recovered.

A solution of 31.5 g. of the hydrochloride in 200 ml. of water was treated with "Darco" and "Hyflo." The mixture was filtered and the solution added to a cold solution of 6.5 g. of sodium hydroxide in 100 ml. of water. The mixture was then filtered and the solid washed with water. The product became gummy during filtration but after drying in a vacuum desiccator there was obtained 26 g. of solid, M. P. 68–77° C. Nineteen grams of crude base was recrystallized from 200 ml. of benzene, giving 14 g. of crystalline powder, M. P. 145–147° C.

Analysis:                                          Percent N
    Calc. for $C_{26}H_{40}N_{10}O_4$_____ 25.18
    Found _____ 24.38

EXAMPLE 6

*Ethylene bis(3,5-dimethylphenyl biguanide)*

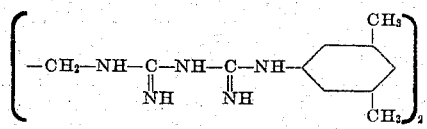

| 3,5-dimethylaniline | 0.2 mole | 24.2 g. |
| HCl (conc.) | 0.2 mole | 20 g. |
| Ethylene bis-dicyandiamide | 0.1 mole | 19.4 g. |
| Water | 100 ml. | |

The solution obtained by refluxing the above mixture did not crystallize after cooling or long standing. At 0° C., a finely-divided solid separated which could not be filtered. The product was converted to the nitrate by the addition of a solution of sodium nitrate. There was obtained 41 g. of solid which melted at 102° C. Crystallization for 600 ml. of 20% aqueous Cellosolve gave 26.5 g. of a crystalline solid, M. P. 166° C.

The free base was obtained by adding an aqueous solution of the nitrate to an excess of cold dilute alkali. The crude base was soluble in benzene. The product was then crystallized from acetonitrile, M. P. 163° C., with decomposition.

Analysis:                                        Percent N
    Calc. for $C_{22}H_{32}N_{10}$_____ 32.11
    Found _____ 31.90

EXAMPLE 7

*Ethylene bis(p-tert-amylphenyl biguanide)*

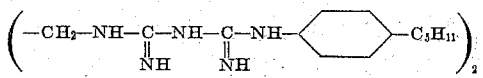

| Ethylene bis-dicyandiamide | 0.2 mole | 38.8 g. |
| p-tert-Amylaniline | 0.4 mole | 65.3 g. |
| HCl (conc.) | 0.4 mole | 40 g. |
| Water | 200 ml. | |

The above mixture was refluxed for 80 minutes. A viscous, white oil separated from the solution on cooling. The product was converted to the nitrate, as in the preceding example, since the hydrochloride did not solidify. The nitrate was obtained in the form of a tacky solid which did not solidify on standing. About 75 ml. of alcohol was added to the reaction mixture and, after stirring and cooling, a product which could be filtered was obtained. The crude product, after air-drying, weighed 128 g. Crystallization from 950 ml. of 50% aqueous alcohol gave 66 g. of white crystalline solid, M. P. 182–184° C.

The free base was obtained by adding a solution of the nitrate in aqueous alcohol to excess, cold, dilute sodium hydroxide. The resulting gummy solid was dried in a vacuum desiccator after the liquid portion had been decanted. When dry, the brittle, glass-like product softened at 98° C. and melted at 110° C.

EXAMPLE 8

*Ethylene bis(o-diphenyl biguanide)*

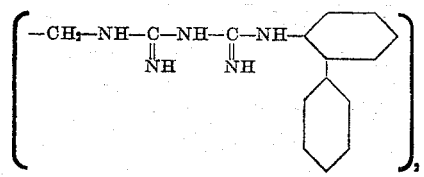

| o-Aminodiphenyl | 0.2 mole | 27.8 g. |
| HCl (conc.) | 0.2 mole | 20 g. |
| Ethylene bis-dicyandiamide | 0.1 mole | 19.4 g. |
| Water | 200 ml. | |

The reaction was carried out in the usual manner. Thirty-five grams of the hydrochloride, M. P. 236° C., was obtained.

Thirty grams of the hydrochloride dissolved in a hot solution of 700 ml. of 40% aqueous Cellosolve. The solution was treated with "Darco" and then added over a period of two hours to a cold solution of 8 g. of sodium hydroxide in 100 ml. of water. The water was decanted from the tacky product. After drying in a vacuum desiccator, a brittle solid weighing 27 g. was obtained. The product dissolved in 150 ml. of warm benzene. The solution was boiled until about 25 ml. of benzene had distilled, thereby removing a trace of water. The resulting cloudy solution was filtered and the filtrate diluted with 100 ml. of cyclohexane. The hot solution was allowed to cool slowly. A tacky solid separated. The solvent was evaporated at room temperature—first at atmospheric pressure and then in a vacuum desiccator. Twenty-four grams of brittle solid which softened at 65° C. was obtained.

Analysis:                                       Percent N
    Calc. for $C_{30}H_{32}N_{10}$_____ 26.32
    Found _____ 21.71

EXAMPLE 9

*Tetramethylene bis(o-tolyl biguanide)*

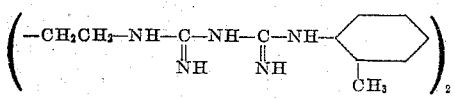

| Tetramethylene bis-dicyandiamide | 0.1 mole | 22.2 g. |
| o-Toluidine | 0.2 mole | 21.4 g. |
| HCl (conc.) | 0.2 mole | 20 g. |
| Water | 100 ml. | |

Tetramethylene bis(o-tolylbiguanide) hydrochloride was obtained in a 77% (29 g.) yield, M. P. 231–233° C., by the usual procedure. Crystallization from water gave crystalline solid melting at 235° C.

Thirty-five grams of the hydrochloride was dissolved in 270 ml. of hot water, the resulting solution treated with "Darco" and then added dropwise to 100 ml. of 8% sodium hydroxide at 5° C. The solid was filtered and then dried in a vacuum desiccator. The 2.7 g. of glass-like solid was recrystallized from methanol to give a crystalline solid melting at 155° C.

Analysis:                                              Percent N
    Calc. for $C_{22}H_{32}N_{10}\cdot 2CH_3OH$_____ 28.1
    Found _____ 28.74

EXAMPLE 10

*Trimethylene bis(o-tolyl biguanide)*

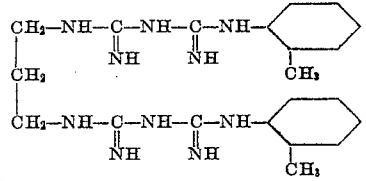

| | | |
|---|---|---|
| Trimethylene bis-dicyandiamide | 0.1 mole | 20.8 g. |
| o-Toluidine | 0.2 mole | 21.4 g. |
| HCl (conc.) | 0.2 mole | 20 g. |
| Water | 75 ml | |

Crude trimethylene bis-dicyandiamide was used. After refluxing the above mixture for about fifteen minutes, a small amount of crystalline solid separated. The mixture was heated for one hour and then cooled in an ice bath. Since more solid did not separate the mixture was filtered. Four grams of solid, M. P. 240–242° C., was obtained. The solid was identified as 1,5-di-o-tolyl biguanide hydrochloride. On long standing, the product crystallized from the filtrate. There was obtained 27.5 g. (55%) yield of the trimethylene bis(o-tolylbiguanide hydrochloride), M. P. 135–140° C. The hydrochloride was converted to the free base in the usual manner.

Analysis: Percent N
  Calc. for $C_{21}H_{30}N_{10}$ _____ 33.18
  Found _____ 29.56

EXAMPLE 11

*Ethylene bis(N-butylphenyl biguanide)*

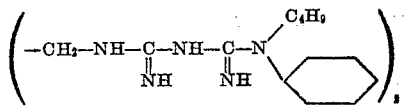

| | | |
|---|---|---|
| Ethylene bis-dicyandiamide | 0.1 mole | 19.4 g. |
| N-Butylaniline | 0.2 mole | 30 g. |
| HCl (conc.) | 0.2 mole | 20 g. |
| Water | 75 ml | |
| Cellosolve | 25 ml | |

After refluxing the above mixture for one hour, it was cooled and allowed to stand for 24 hours, but the product did not crystallize. A solution containing 0.3 mole of sodium nitrate was added. The product separated as an oil but after decanting the aqueous layer and washing with water, it solidified. The mixture was filtered and the solid air-dried. A yield of 36 g. (58%) of the nitrate, M. P. 265–267°, was obtained. Recrystallization of the product from 160 ml. of water gave 22 g. of solid, M. P. 186–188° C. The salt may have been hydrated.

Analysis: Percent N
  Calc. for $C_{26}H_{40}N_{10} \cdot 2HNO_3$ _____ 27.18
  Found _____ 25.99

The remaining material was converted to the free base in the usual manner. The base was an oil, so the mixture was extracted with benzene. The benzene solution was dried over calcium sulfate and the benzene was then removed in a vacuum desiccator.

EXAMPLE 12

*N-butyl-1,3-propylene bis(phenylbiguanide)*

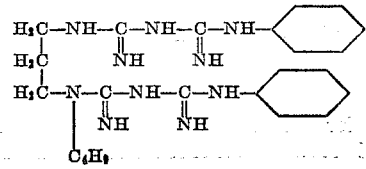

To the oil obtained in the preparation of N-butyl-1,3-propylene bis-dicyandiamide 0.4 mole aniline, 0.4 mole hydrochloric acid (37%) and 100 ml. of water were added. The mixture was refluxed for one hour and then cooled, but no solid crystallized from the solution. The solution was divided into two equal parts which were treated as follows:

A. To the first portion of the reaction mixture, 0.2 mole of sodium nitrate solution was added. The oily product which separated did not solidify.

B. After standing for two days at room temperature, the hydrochloride had crystallized from the other portion. Filtration gave 47 g. of solid which melted between 110–120° C.

The hydrochloride was dissolved in 250 ml. of water. The solution was treated with "Darco" and then added dropwise to 100 ml. of 10% sodium hydroxide at 5° C. Solid which could be filtered without difficulty was obtained, but as soon as the water was removed the solid became tacky. The weight of the brittle material obtained after drying in a vacuum desiccator was 28 g. This material was dissolved in 135 ml. of benzene. Benzene (35 ml.) was distilled from the solution to remove a small amount of water. The solution was filtered and the filtrate heated. Hexane was added and the solution allowed to cool. The solvent was decanted from the tacky solid which separated. The product was dried in a desiccator.

The bis-biguanides have been found to increase the induction periods of a given gasoline when tested in the absence of metals. Table I shows the inhibitory activity of the bis-biguanides in a substantially 100% thermally-cracked, metal-free gasoline with the tabulated figures representing the induction periods in minutes (reference ASTM-D-525-49) at the treating concentrations given.

TABLE I

| | Concentration, percent of additive | | |
|---|---|---|---|
| | 0.00 | 0.001 | 0.01 |
| Gasoline B (av. of 15 runs) | 185 | | |
| +ethylene bis(o-tolyl biguanide) | | 235 | 305 |
| +ethylene bis(3,5-dimethylphenylbiguanide) | | | 320 |
| +ethylene bis(diphenyl biguanide) | | | 255 |
| +ethylene bis(p-tert-amylphenyl biguanide) | | | 280 |
| +ethylene bis(nonylphenyl biguanide) | | | 300 |
| +ethylene bis(N-butylphenyl biguanide) | | | 265 |
| +trimethylene bis(o-tolyl biguanide) | | | 280 |
| +tetramethylene bis(o-tolyl biguanide) | | | 305 |
| +N-butyl trimethylene bis(phenyl biguanide) | | | 280 |
| Gasoline C (av. of 11 runs) | 165 | | |
| +ethylene bis(amylnaphthyl biguanide) | | | 210 |
| +ethylene bis($C_4$–$C_7$ alkylphenyl biguanide) | | | 265 |

The bis-biguanides were also tested as copper deactivators in gasoline. The tests were performed, as before, with the copper being introduced in the form of concentrates of copper naphthenate in heptane such that the addition of 1 cc. of the concentrate and dilution to 50 cc. with gasoline produced a solution containing 2 parts per million (p. p. m.) of the copper metal. Table II indicates the percentage recovery of the induction period of untreated gasoline when bis-biguanides are used in conjunction with copper naphthenate. While different gasolines vary slightly in their sensitivity to copper, the approximate percent of the original induction period which would result from copper in the absence of deactivator is 44%, 28%, 19% and 14% for ½, 1, 2 and 4 p. p. m. of copper respectively. These are to be noted for the purposes of comparison.

TABLE II

| p. p. m. bis-biguanide | 100 | 10 | 25 | 20 | 10 | 5 |
| --- | --- | --- | --- | --- | --- | --- |
| p. p. m. soluble Cu | 4 | ½ | 2 | 2 | 1 | ½ |
| ethylene bis(o-tolyl biguanide) | 151 | 122 | 127 | 78 | 87 | 111 |
| ethylene bis(2,4-dimethylphenyl biguanide) | 132 | | | | 60 | |
| ethylene bis(p-tert-amylphenyl biguanide) | 119 | | 119 | | 114 | |
| ethylene bis (nonylphenyl biguanide) | 130 | 122 | 116 | | 64 | |
| ethylene bis($C_3$–$C_6$ alkyl phenyl biguanide) | 140 | | | | 121 | |
| trimethylene bis(o-tolyl biguanide) | 138 | | | | 105 | |
| tetramethylene bis(o-tolyl biguanide) | 141 | | | | 65 | |
| N-butyl-1,3-propylene bis (phenyl biguanide) | 119 | | | | 73 | |
| Control (no bis-biguanide) | 14 | 44 | 19 | 19 | 28 | 44 |

The improvement in induction period in copper-treated gasoline containing bis-biguanides over copper-treated gasoline not containing any additive is thus shown in Table II but it is to be observed that such values are due to the combination of the properties of deactivation of copper and inhibition. Table III is therefore set forth herewith to illustrate only the copper deactivation properties by correcting for inhibitory effects. The figures set forth in Table III are therefore expressed as the amounts of undeactivated copper which could account for the induction periods after correcting for the inhibitory properties of the bis-biguanide.

TABLE III

| p. p. m. bis-biguanide | 100 | 10 | 25 | 20 | 10 | 5 |
| --- | --- | --- | --- | --- | --- | --- |
| p. p. m. soluble Cu | 4 | ½ | 2 | 2 | 1 | ½ |
| ethylene bis(o-tolyl biguanide) | 0.00 | 0.00 | 0.00 | 0.09 | 0.05 | 0.00 |
| ethylene bis(2,4-dimethylphenyl biguanide) | 0.00 | | | | 0.20 | |
| ethylene bis(p-tert-amylphenyl biguanide) | 0.025 | | 0.00 | | 0.00 | |
| ethylene bis(nonylphenyl biguanide) | 0.00 | 0.00 | 0.00 | | 0.50 | |
| trimethylene bis(o-tolyl biguanide) | 0.00 | | | | 0.00 | |
| tetramethylene bis(o-tolyl biguanide) | 0.00 | | | | 0.15 | |
| N-butyl-1,3-propylene bis-(phenyl biguanide) | 0.03 | | | | 0.10 | |
| ethylene bis(N-butyl phenyl biguanide) | 0.42 | | | | | |

It is believed that the tying together of the two biguanide molecules by means of a bifunctional group, such as ethylene, trimethylene, tetramethylene, or the like groups vastly increases the effectiveness of the deactivation.

A test was performed to determine the relative stabilizing values of a bis-biguanide as compared to a biguanide with regard to discoloration of soap. 0.1% of the selected additive was milled into the soap sample which contained no other additives and the resulting mixture was pressed into a cake and placed in sealed jars maintained at 80° C. in a circulating oven. The following results were obtained with the number 1 being assigned to the lightest of the three samples and the number 3 being assigned to the darkest sample.

TABLE IV.—DISCOLORATION OF SOAP SAMPLES AT 80° C.

| Sample | Time in days | | | |
| --- | --- | --- | --- | --- |
| | 0 | 2 | 3 | 164 |
| o-diphenylbiguanide | 3 | 3 | 2 | 3 |
| o-tolylbiguanide | 2 | 2 | 3 | 2 |
| ethylene bis(o-tolyl biguanide) | 1 | 1 | 1 | 1 |

The amounts of the bis-biguanide to be added to stabilize the organic composition may be varied with wide ranges depending upon the nature of the material to be stabilized, the degree of stabilization required, the solubility of the bis-biguanide in the particular organic composition, the economies of the situation involved, etc. It has been found, however, that the common scope of usage of the bis-biguanides falls within the range of from about 0.0001% to about 1.0% by weight as based on the weight of the organic composition to be stabilized.

Although we have described but a few specific examples and applications of our inventive concept, we consider the broad aspects of the same not to be limited to the specific substances or substrates mentioned therein but to include various other compounds and substrates of equivalent function and constitution as set forth in the claims appended hereto. It is understood that any suitable changes, modifications and variations may be made without departing from the spirit and scope of the invention.

I claim:

1. As a new compound, a polymethylene bis-biguanide wherein the polymethylene radical contains up to four carbon atoms and each biguanide radical contains a hydrocarbon aryl radical.

2. As a new compound, a bis-biguanide having the following structural formula:

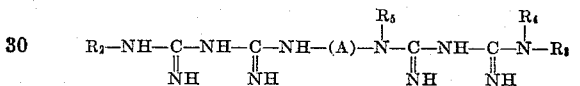

wherein $R_2$ and $R_3$ are members of the group consisting of aryl and alkaryl radicals, $R_4$ and $R_5$ are members of the group consisting of alkyl radicals having up to five carbon atoms and hydrogen, and A is an alkylene group having from one to four carbon atoms.

3. An antioxidant and metal deactivator for stabilizing organic compositions normally subject to the oxidative and deteriorative effects of air and metal comprising a polymethylene bis-biguanide wherein the polymethylene radical contains up to four carbon atoms and each biguanide radical contains a substituent having a monocyclic hydrocarbon.

4. An antioxidant and metal deactivator for stabilizing organic compositions normally subject to the oxidative and deteriorative effects of air and metal comprising an ethylene bis-biguanide wherein each biguanide radical contains a substituent tolyl radical.

5. An antioxidant and metal deactivator for stabilizing organic compositions normally subject to the oxidative and deteriorative effects of air and metal comprising a trimethylene bis-biguanide wherein each biguanide radical contains a substituent tolyl radical.

6. An antioxidant and metal deactivator for stabilizing organic compositions normally subject to the oxidative and deteriorative effects of air and metal comprising a tetramethylene bis-biguanide wherein each biguanide radical contains a substituent tolyl radical.

7. An antioxidant and metal deactivator for stabilizing organic compositions normally subject to the oxidative and deteriorative effects of air and metal comprising an ethylene bis-biguanide wherein each biguanide radical contains a substituent phenyl radical.

References Cited in the file of this patent
UNITED STATES PATENTS

| 2,353,960 | Clarkson et al. | July 18, 1948 |
| --- | --- | --- |
| 2,373,021 | Downing et al. | Apr. 3, 1945 |
| 2,455,896 | Nagy | Dec. 7, 1948 |